DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1386

T869,022

PARTIALLY OXIDIZED POLYETHYLENE COATINGS FOR FRESH EGGS

William F. Baxter, Jr., and Willie E. Draper, both of P.O. Box 511, Kingsport, Tenn. 37662

Filed July 7, 1969, Ser. No. 839,625
Int. Cl. A23b *5/06*
U.S. Cl. 99—161
No Drawing. 17 Pages Specification

Partially oxidized polyethylene having the following properties:

| | |
|---|---|
| Molecular weight | About 1,000 to 5,000. |
| Melt viscosity, cp. (Brookfield) | Less than about 2,500 at 125° C. |
| Acid number | About 10 to 60. |
| Ring and ball softening point, ° C. | About 95° to 140° C. |
| Density, 25° C. | About 0.85 to 1.05. |

when applied to fresh eggs, has been found to form protective coatings which greatly reduce the moisture loss by evaporation from the egg and retard spoilage of fresh eggs held at room temperature.

The preferred wax blends used in preparing the coatings consists essentially of about 30 to 100% by weight oxidized polyethylene and about 0 to 70% by weight paraffin wax. The wax blends are utilized for preparing emulsions consists essentially of about 40 parts of the wax blends, and about 14 parts surfactant, to about 150 parts water. The preferred surfactant is an emulsifier system of oleic acid and morpholine. The emulsions are then diluted with water to produce the coating material which contains a total of about 5 to 20% by weight of the wax blend and surfactant. Advantageously, about 90 to 70% by weight of the coating material is blended with about 10 to 30% by weight of an alkali-soluble leveling agent.